United States Patent [19]
Pearson et al.

[11] 3,772,032
[45] Nov. 13, 1973

[54] PHOTOGRAPHIC SILVER HALIDE EMULSIONS

[75] Inventors: Ian Pearson; Louis Butler; Louis A. Errede, all of Harlow, England

[73] Assignee: Minnesota Mining and Manufacturing Company, St. Paul, Minn.

[22] Filed: June 16, 1971

[21] Appl. No.: 153,903

[30] Foreign Application Priority Data
June 17, 1970  Great Britain.................. 29,458/70

[52] U.S. Cl................................. 96/114, 96/114.5
[51] Int. Cl.......................... G03c 1/04, G03c 1/38
[58] Field of Search........................... 96/114, 114.5

[56] References Cited
UNITED STATES PATENTS
3,547,650  12/1970  Pilato.................................... 96/114
3,525,620  8/1970  Nishio et al............................ 96/114

*Primary Examiner*—Ronald H. Smith
*Attorney*—Alexander, Sell, Steldt & Delahunt

[57] ABSTRACT

A silver halide photographic emulsion wherein silver halide grains are distributed throughout an aqueous colloid which includes a polymeric latex prepared by emulsion polymerization in the presence of at least 5 percent by weight of an emulsifying agent, which latex reduces stress-sensitivity of the emulsion.

8 Claims, No Drawings

PHOTOGRAPHIC SILVER HALIDE EMULSIONS

This invention relates to photographic silver halide emulsions and is particularly concerned with emulsions containing gelatin and polymeric latices.

BACKGROUND TO THE INVENTION

While gelatin silver halide emulsions of reasonably high gelatin content may have good photographic properties, the drying time of such emulsions after they have been developed and fixed is quite high because the gelatin tends to absorb relatively large amounts of water. To overcome this at least part of the gelatin may be replaced with a polymeric latex, suitable polymers and copolymers being those prepared from acrylate and methacrylate monomers. The incorporation of these latices has also been found to eliminate the increase in granularity of image normally observed in emulsions having a relatively low gelatin content as described, for example, in our co-pending British Patent Application No. 1147/68 (U.S. Pat. No. 1,247,684). However, emulsions having a relatively low gelatin content have been found to become more sensitive to stress. Thus when such an emulsion has been subjected to stress and is then developed, there is an increase in the background fog, i.e. an increase in optical density in unexposed areas. Naturally this effect is undesirable from photographic point of view.

Emulsions containing the polymeric latices are generally prepared by adding to a gelatin silver halide emulsion the required amount of the polymeric latex. The latter can conveniently be prepared by emulsion polymerization from the monomer or monomers and during this emulsion polymerization small amounts of suitable emulsifiers are generally incorporated. The amount of emulsifier used, however, is generally less than 1% and its function is purely to assist in the formation of the latex.

BRIEF DESCRIPTION OF THE INVENTION

We have now surprisingly found according to the invention that if one incorporates comparatively large amounts of the emulsifier into the polymeric latex, that is to say, more than about 5%, and preferally from 10% to 20% by weight of emulsifier based on the weight of the solids in the polymeric latex, this substantially decreases the sensitivity to stress of the photographic silver halide emulsions into which the latex is incorporated. Therefore according to the invention there is provided a silver halide photographic emulsion in which the silver halide grains are distributed throughout an aqueous colloid which includes a polymeric latex which has been prepared by emulsion polymerization in the presence of at least 5% by weight of an emulsifying agent based on the weight of solids in the polymeric latex.

Silver halide emulsions according to the invention and containing such latices show less tendency to produce pressure marks and generally give lower background fog levels than similar emulsions containing only the small amounts of the emulsifying agent which are required during the polymerization of the latex.

In silver halide emulsions containing both gelatin and a polymeric latex, the small polymer particles are very much harder than the gelatin. It is therefore believed that the use of such polymeric latices deleteriously effects the photographic properties of the emulsions because placing the emulsion under stress caused the hard polymer particles to press into the silver halide grains and by some means renders these grains developable so producing background fog. We believe that, when a large amount of the emulsifying agent is incorporated into the polymeric latex in the manner of the present invention, the polymeric particles take on what is known as a "structured form"; that is to say they appear to have a core of hard polymeric material surrounded by an outer layer containing a comparatively large proportion of physically or chemically combined emulsifying agent. This outer layer is much softer than the core and also tends to enable the particle to slip across the silver halide grains rather than press into them when the emulsion is placed under pressure. We therefore believe that this softer outer layer and/or the ease of slipping may prevent the silver halide grains from being placed under conditions which might render them developable so producing background fog.

Small amounts of the emulsifying agent in the outer layer are able to diffuse away from the outer layer into the bulk of the emulsion. This is found to have the important advantage of reducing or eliminating drying marks from the surface of photographic films which include at least one layer of the emulsion according to the invention.

The large amount of emulsifying agent must be added to the polymeric latex during the preparation of the latex to acheive the desired reduction in fog due to strain. In this way the emulsifying agent will ensure that the polymerization is the required emulsion polymerization. Also it then appears to form the outer layer referred to above surrounding the core of hard polymer because the hydrophobic part of the emulsifying agent's molecule will be directed towards the core while the hydrophilic part will be directed outwardly from the core so forming the structured latex referred to above. Once the polymeric latex has been prepared in this way, it can be added to a prepared gelatin silver halide emulsion to give a photographic emulsion according to the invention.

It is preferred that the emulsifying agent which is used in the formation of the polymeric latex according to the invention in large amounts to obtain the advantages noted above be an anionic emulsifying agent. The emulsifying agent should not induce too much foaming since this could prevent satisfactory polymerization when this agent is present in the large amounts. A particularly preferred emulsifying agent is a polyalkylene oxide e.g. a polyethylene or polypropylene oxide, terminated with aryloxide such as phenoxide and phosphate end groups, an example of which is sold by General Anilin and Film Corporation under the trade name Gafac RE 610. Other suitable emulsifying agents include the sodium cetyl to octadecyl sulphate sold under the trade name Maprofix, and sodium lauryl sarcosinate.

The polymeric latex incorporated in the emulsion can be any suitable homo-polymer or copolymer latex prepared by emulsion polymerization. Examples are the addition polymers of ethylenically unsaturated monomers, e.g. blends of acrylate homo-polymers and copolymers such as the copolymer formed from 50% butyl acrylate and 50% styrene, and polyethylacrylate-methylmethacrylate copolymers, or acrylonitrile, styrene, butadiene or isobutylene homopolymers or copolymers.

In general the gelatin in the emulsion is not completely replaced by the polymeric latex although the invention is to be construed as covering this possibility. A typical silver halide emulsion according to the invention, however, contains about 2 parts by weight of gelatin and about 1 part by weight of the solids of the polymeric latex.

With regard to the photographic emulsion itself, this can be a conventional negative-type emulsion and the silver halide grains can be formed in the conventional way as is well known from silver chloride, silver bromide, silver iodide or mixtures of them. Also the photographic silver halide emulsion of the invention can be spread for use in the normal way as a thin layer on a suitable photographic substrate such as a plastics sheet e.g. a polyester sheet or a paper sheet or a glass plate.

The photographic silver halide emulsions containing the polymeric latices according to the invention have excellent photographic properties and are very suitable for use in the recording of X-ray images because of the relatively quick drying of the developed and fixed emulsion. The polymeric latices according to the invention can also be incorporated into photographic emulsions for use in the recording of black and white, and coloured images.

DESCRIPTION OF THE PREFERRED EMBODIMENTS

The invention will now be illustrated by the following examples.

EXAMPLE 1

A series of aqueous polymeric latices were prepared by stirring and heating together at 85°C water (4 parts), ethyl acrylate monomer (2 parts), the sodium salt of Gafac RE 610 in an amount which varied from latex to latex as set out in the following Table I, and ammonium persulphate initiator (0.0001) part, until the emulsion polymerization was complete.

The resulting polymeric latices were then separately incorporated into gelatin silver iodobromide emulsions having an average grain size of $1.45\mu$, Ag I content of 1.8% by weight, and a silver to gelatin ratio by weight of about 1.8, such that the weight of gelatin in the resulting emulsion was twice the solids content of the polymeric latex. The resulting emulsions were coated as a thin layer on polyester photographic bases to give a silver coating weight of $50mg/dm^2$, supercoated with gelatin containing a hardening agent, and allowed to dry.

After having attained an acceptable level of hardness, the coatings so prepared were then subjected to stress by drawing a fixed wheel probe with a constant load of $100g/mm^2$ across the dry coating surface. The coatings were not exposed to light but were directly developed and processed. When dry, the developed coatings were checked for optical density in the stressed areas using a microdensitometer.

TABLE I

| Amount of emulsifying agent (parts by weight per 100 parts of monomer) | Optical density in stressed regions | Optical density in non-stressed regions (i.e. Base+Fog) | Increase in optical density in stressed regions |
|---|---|---|---|
| 1.25 | 0.50 | 0.25 | 0.25 |
| 2.5 | 0.475 | 0.25 | 0.225 |
| 5.0 | 0.45 | 0.25 | 0.20 |
| 10.0 | 0.41 | 0.25 | 0.16 |
| 20.0 | 0.39 | 0.25 | 0.14 |

As can be seen from the results listed above, the larger the proportion of emulsifying agent the less sensitive is the emulsion to stress. In particular the optical density in the unexposed regions is very substantially reduced when the proportion of emulsifying agent approaches 10% by weight of the monomer charge or more. In addition to this it can be seen that increasing the amount of emulsifying agent did not increase the amount of fog in the un-stressed regions.

EXAMPLE 2

Various photographic silver halide emulsions were prepared as described in Example 1 using various polymer latices and emulsifying agents. After coating onto polyester photographic basis, the granularity values (Selwyn) of the resulting coatings were measured so as to determine whether the incorporation of relatively large amounts of the emulsifying agent deleteriously affected this important characteristic of the developed image. The results are shown in the following Table II.

TABLE II

| Polymer used in latex | Emulsifying agent Type | percentage by weight of solids in latex | Granularity |
|---|---|---|---|
| Polyethylacrylate | Maprofix (sodium cetyl to octadecyl sulphate) | 1 | 2.3 |
| Polyethylacrylate | Gafac RE 610 | 5 | 2.4 |
| Ethylacrylate-methyl methacrylate coplymer (50/50) | Gafac RE 610 | 5 | 2.35 |
| Ethylacrylate - methyl methacrylate copolymer (30/70) | Gafac RE 610 | 5 | 2.4 |

As can be seen the granularity of the emulsions containing according to the invention relatively large amounts of the emulsifying agent Gafac RE610 was comparable with that of emulsions containing conventional, relatively small amounts of the emulsifying agent. Therefore, the incorporation of relatively large amounts of the emulsifying agent can reduce the sensitivity of the photographic emulsions to stress without deleteriously affecting the granularity of the emulsion.

EXAMPLE 3

Various photographic silver halide emulsions were prepared as set out generally in Example 1 using polymeric latices containing various proportions of ethyl acrylate in the polymer; in all cases however, the emulsifying agent was Gafac RE 610 used in a proportion of 5% by weight of the monomer or monomers. The emulsions were coated and then developed, after which the amount of fog was checked. The results are set out in the following Table III.

TABLE III

| Copolymer % by weight of ethyl acrylate | % by weight of methyl methacrylate | Optical density in non-stressed regions (i.e. Base Fog) |
|---|---|---|
| 100 | 0 | 0.24 |
| 50 | 50 | 0.26 |
| 30 | 70 | 0.26 |
| 0 | 100 | 0.26 |

As can be seen, these results show that there is no increase in fog when large proportions of methyl methacrylate are used for the preparation of the latex, whereas normally the use of a copolymer containing 50% or more of methyl methacrylate gives intolerable increases in fog.

EXAMPLE 4

Photographic silver halide emulsions were prepared as set out generally in Example 1 using polymeric latices containing 50% by weight acrylate and 50% by weight methyl methacrylate copolymer, and ethyl acrylate homopolymer, and various amounts of Gafac RE 610 emulsifying agent as set out in the following Tables IV and V. The emulsions were coated onto photographic bases as dscribed in Example 1, stressed as described in Example 1 at various pressures as set out in the following Tables IV and V, and then developed and the resulting optical densities determined as described in Example 1.

The results obtained for the coatings of emulsions containing the ethyl acrylate methyl methacrylate copolymer and the ethyl acrylate homopolymer as set out in the following Tables IV and V, respectively.

TABLE IV

| Percentage by weight of emulsifying agent (Gafac RE 160) by weight of solids in polymeric latex made from 50% ethyl acrylate and 50% methyl methacrylate | Increase in density in stressed areas as compared with non-stressed areas at stresses of (g/mm$^2$) | | |
|---|---|---|---|
| | 120 | 160 | 240 |
| 10 | 0.15 | 0.20 | 0.25 |
| 15 | 0.13 | 0.16 | 0.20 |
| 20 | 0.10 | 0.14 | 0.20 |
| 40 | 0.08 | 0.10 | 0.13 |

TABLE V

| Precentage by weight of Emulsifying agent (Gafac RE 610) by weight of solids in polymeric latex made from 100% ethyl acrylate | Increase in density in stressed areas as compared with non-stressed areas at stresses of (g/mm$^2$) | | | |
|---|---|---|---|---|
| | 80 | 100 | 120 | 160 |
| 1.0 | 0.16 | 0.25 | 0.35 | 0.71 |
| 2.5 | 0.15 | 0.225 | 0.30 | |
| 5.0 | 0.13 | 0.20 | 0.29 | |
| 10.0 | 0.12 | 0.16 | 0.25 | |
| 20.0 | 0.10 | 0.14 | 0.20 | 0.47 |

As can be seen the decrease in sensitivity to stress with relatively large amounts of emulsifying agent is manifest using either type of polymeric latex over a wide range of stress values.

EXAMPLE 5

A series of aqueous polymeric latices were prepared by stirring and heating together water (4 parts), ethyl acrylate (2 parts), the sodium salt of GAFAC RE 610 in an amount which varied from latex to latex, and ammonium persulphate initiator (0.0001 part), at 85°C until emulsion polymerisation was essentially complete. Excess unreacted monomer was removed by steam distillation. The resulting polymeric latices were then separately incorporated into conventional gelatin, silver-halide, X-ray emulsions, such that the weight of gelatin in the system was twice the solid content of the polymeric latex. The resulting emulsions were coated as a thin layer on polyester base and allowed to harden. The coatings so prepared were then subjected to a stress provided by a probe drawn across the dry film at constant speed and pressure. The probe consists of a polished steel disk, 1 cm in diameter and 0.5 mm in width. The films were then developed and the differences in density ($\Delta D$) between that in the stressed area Ds and the background area Do (i.e. $\Delta D = Ds - Do$) was recorded as a function of the amount of emulsifying agent added in the preparation of the polymer latex emulsion used in the preparation of the photographic film. The results are collected in Table VI below.

TABLE VI

| Percentage surfactant (by weight of monomer) | Base plus fog | $\Delta D$ | | | | |
|---|---|---|---|---|---|---|
| | | Stress 20 g. | Stress 25 g. | Stress 30 g. | Stress 40 g. | Stress 50 g. |
| 1 | 0.25 | 0.16 | 0.25 | 0.35 | 0.71 | 1.10 |
| 2.5 | 0.25 | 0.15 | 0.225 | 0.30 | | |
| 5 | 0.25 | 0.13 | 0.20 | 0.29 | 0.51 | |
| 10 | 0.25 | 0.12 | 0.16 | 0.25 | | |
| 20 | 0.25 | 0.10 | 0.14 | 0.20 | 0.47 | 0.73 |

It is quite clear from the above results that the larger the proportion of surfactant the less sensitive is the film to stress. In addition to this it can be seen that increasing the amount of surfactant did not increase the amount of fog (i.e. base + fog remained substantially constant).

EXAMPLE 6

Ethyl acrylate/methyl methacrylate (50/50) copolymers was prepared with a series of various concentrations of GAFAC RE 610 surfactant and evaluated in the same way as in Example 1. The results are given in the following Table VII.

TABLE VII

| Percentage surfactant (by weight of monomer) | $\Delta D$ | | | | |
|---|---|---|---|---|---|
| | Stress 30g | Stress 40g | Stress 60g | Stress 120g | Stress 180g |
| 10 | 0.15 | 0.20 | 0.25 | 0.90 | 1.35 |
| 15 | 0.13 | 0.16 | 0.20 | 0.90 | 1.30 |
| 20 | 0.10 | 0.14 | 0.20 | 0.85 | 1.25 |
| 40 | 0.08 | 0.10 | 0.13 | 0.30 | 0.97 |

The above results again demonstrate the advantage, and further, show it to be independent of the composition of the latex particles and to be operative over a wide range of stress values.

EXAMPLE 7

A series of ethyl acrylate/methyl methacrylate (30/70 respectively) copolymers were prepared with various concentrations of GAFAC RE 610 surfactant and they were tested for stress, in the same way as described in Example 5. The results obtained are given in the following Table VIII.

TABLE VIII

| Percentage surfactant (by weight of monomer) | $\Delta D$ | | | | | |
|---|---|---|---|---|---|---|
| | Stress 20 g. | Stress 30 g. | Stress 40 g. | Stress 60 g. | Stress 120 g. | Stress 180 g. |
| 10 | 0.12 | 0.16 | 0.19 | 0.25 | 0.60 | 1.30 |
| 40 | 0.04 | 0.06 | 0.10 | 0.13 | 0.45 | 0.71 |

EXAMPLE 8

The results presented in the following Table IX were obtained for a series of ethyl acrylate/methyl methacrylate (50/50) copolymeric latices, prepared with various concentrations of sodium lauryl sarcosinate surfactant, in the same way as described in Example 1.

TABLE IX

| Percentage surfactant (by weight of monomer) | ΔD | | | | | |
|---|---|---|---|---|---|---|
| | Stress 20 g. | Stress 30 g. | Stress 40 g. | Stress 60 g. | Stress 120 g. | Stress 180 g. |
| 5 | 0.26 | 0.95 | 1.05 | 1.30 | 1.40 | 1.40 |
| 10 | 0.25 | 0.55 | 0.90 | 1.25 | 1.40 | 1.40 |
| 20 | 0.25 | 0.40 | 0.52 | 0.75 | 1.04 | 1.30 |

EXAMPLE 9

The results presented below in Table X were obtained for a series of ethyl acrylate/methyl methacrylate (50/50) copolymeric latices prepared with various concentrations of 'Maprofix' (sodium lauryl sulphate) in the same way as described in Example 1.

TABLE X

| Percentage surfactant (by weight of monomer) | ΔD | | | |
|---|---|---|---|---|
| | Stress 20g | Stress 60g | Stress 120g | Stress 180g |
| 2 | 0.06 | 0.11 | 0.46 | 0.78 |
| 5 | 0.05 | 0.11 | 0.23 | 0.50 |

The results above demonstrate again that as the amount of surfactant increases, the response to stress decreases.

When a series of experiments were undertaken in which various concentrations of surfactants were added to standard 50/50 ethyl acrylate/methyl methacrylate copolymer formulations after the preparation of the copolymer the results were far inferior to those obtained by adding the surfactant to the latex during the emulsion polymerisation preparation. In cases where addition of the surfactant was made after polymerisation, poor sensitometric results were obtained, consistently high fog values were found for the unstressed films, thus confirming that the surfactant must be in some way bound to the polymer particles.

On the other hand, the above Examples show that when a large amount of emulsifying agent is added during the preparation of the polymeric latex and the resulting latex used as at least part of the aqueous colloid in a photographic silver halide emulsion, the resulting emulsions have low stress sensitivity, the stress sensitivity being lower the larger the amount of emulsifying agent added.

We claim:

1. A silver halide photographic emulsion in which the silver halide grains are distributed throughout an aqueous colloid which includes a polymeric latex which has been prepared by emulsion polymerization in the presence of at least 5% by weight of an emulsifying agent based on the weight of solids in the polymeric latex, in which said emulsifying agent is a polyalkylene oxide terminated with aryloxide and phosphate end groups.

2. An emulsion according to claim 1 in which the aqueous colloid consists of a mixture of gelatin and said polymeric latex.

3. An emulsion according to claim 2 which contains about 2 parts in weight of gelatin and about 1 part by weight of solids of said polymeric latex.

4. An emulsion according to claim 1 in which said polymeric latex is an acrylate homopolymer or copolymer.

5. An emulsion according to claim 4 in which said polymeric latex is a blend of 50% butyl acrylate and 50% styrene or a poly-ethylacrylate-methylmethacrylate copolymer.

6. An emulsion according to claim 1 in which said emulsifying agent is a polyethylene oxide terminated with phenoxide and phosphate end groups.

7. An emulsion according to claim 1 in which said emulsifying agent is a polypropylene oxide terminated with aryloxide and phosphate end groups.

8. A photographic material which includes a photographic backing sheet and at least one layer of silver halide emulsion of claim 1.

* * * * *